US012431254B2

(12) United States Patent
Logue et al.

(10) Patent No.: US 12,431,254 B2
(45) Date of Patent: Sep. 30, 2025

(54) IRRADIATION TARGETS FOR THE PRODUCTION OF RADIOISOTOPES

(71) Applicant: BWXT Isotope Technology Group, Inc., Lynchburg, VA (US)

(72) Inventors: Evan Thomas Logue, Lynchburg, VA (US); Andrew Cary Whitten, Lynchburg, VA (US)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 336 days.

(21) Appl. No.: 17/843,625

(22) Filed: Jun. 17, 2022

(65) Prior Publication Data

US 2022/0406482 A1 Dec. 22, 2022

Related U.S. Application Data

(60) Provisional application No. 63/344,391, filed on May 20, 2022, provisional application No. 63/212,177, filed on Jun. 18, 2021.

(51) Int. Cl.

*G21G 1/00* (2006.01)
*G21G 1/02* (2006.01)
*G21K 5/08* (2006.01)

(52) U.S. Cl.

CPC ................. *G21G 1/00* (2013.01); *G21G 1/02* (2013.01); *G21K 5/08* (2013.01); *G21G 2001/0036* (2013.01); *G21G 2001/0042* (2013.01)

(58) Field of Classification Search

CPC .... G21G 1/00; G21G 1/02; G21G 2001/0036; G21G 2001/0042; G21K 5/08

(Continued)

(56) References Cited

U.S. PATENT DOCUMENTS 7,526,058 B2 4/2009 Fawcett et al.
8,576,972 B2 11/2013 Smith et al.

(Continued)

FOREIGN PATENT DOCUMENTS

WO 2018/156910 A1 8/2018

OTHER PUBLICATIONS

International Preliminary Report on Patentability, PCT/US2022/34064, dated Dec. 14, 2023, 7 pages.

(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

An irradiation target for the production of radioisotopes comprises a plurality of plates having aligned central openings. First and second elongated central members extend in opposite directions through the aligned central openings of the plates. The first and second elongated central members each have a pair of wings at first and second ends of the plurality of plates, respectively. The first and second elongated central members further have a pair of tabs adjacent to the wings of the other elongated central member. Tabs of the first elongated central member are bent to engage one end face of the plurality of plates. Tabs of the second elongated central member are folded over the wings of the first elongated central member. The plates and the first and second elongated central members are formed of materials that produce molybdenum-99 (Mo-99) by way of neutron capture.

7 Claims, 10 Drawing Sheets

(58) Field of Classification Search
USPC .................................................. 376/158, 202
See application file for complete search history.

(56) References Cited

U.S. PATENT DOCUMENTS

| | | | |
|---|---|---|---|
| 9,899,107 | B2 | 2/2018 | Higgins et al. |
| 2009/0135989 | A1 | 5/2009 | Russell, II et al. |
| 2009/0274260 | A1 | 11/2009 | Russell, II et al. |
| 2011/0216868 | A1 | 9/2011 | Russell, II et al. |
| 2013/0301769 | A1 | 11/2013 | Schaffer et al. |
| 2014/0348284 | A1 | 11/2014 | Diamond et al. |
| 2017/0048962 | A1 | 2/2017 | Zeisler et al. |
| 2017/0243666 | A1 | 8/2017 | Khajeali Chaleshtori et al. |
| 2018/0322973 | A1* | 11/2018 | Fisher ...................... G21G 1/02 |
| 2019/0043630 | A1 | 2/2019 | Fisher et al. |
| 2020/0027618 | A1 | 1/2020 | Onderwater et al. |
| 2020/0090824 | A1 | 3/2020 | Onderwater et al. |
| 2022/0406484 | A1 | 12/2022 | Logue |

OTHER PUBLICATIONS

International Preliminary Report on Patentability, PCT/US2022/34046, dated Dec. 14, 2023, 5 pages.
International Search Report and Written Opinion, PCT/US2022/34064, dated Sep. 22, 2022, 9 pages.
International Search Report and Written Opinion, PCT/US2022/34046, dated Sep. 21, 2022, 7 pages.

* cited by examiner

IRRADIATION TARGETS FOR THE PRODUCTION OF RADIOISOTOPES

CLAIM OF PRIORITY

This application claims priority to U.S. Provisional Patent Application No. 63/212,177 filed Jun. 18, 2021, and the benefit of U.S. Provisional Patent Application No. 63/344,391 filed May 20, 2022, the entire disclosures of which are incorporated herein.

TECHNICAL FIELD

The presently-disclosed invention relates generally to titanium-molybdate-99 materials suitable for use in technetium-99m generators (Mo-99/Tc-99m generators) and, more specifically, irradiation targets used in the production of those titanium-molybdate-99 materials and a debundling tool for the disassembly of the irradiation targets.

BACKGROUND

Technetium-99m (Tc-99m) is the most commonly used radioisotope in nuclear medicine (e.g., medical diagnostic imaging). Tc-99m (m is metastable) is typically injected into a patient and, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites after subsequent processing steps to reduce the Mo-99 to a usable form. Mo-99/Tc-99m generators are then distributed from these centralized locations to hospitals and pharmacies throughout the country. Since Mo-99 has a short half-life and the number of production sites are limited, it is desirable to minimize the amount of time needed to reduce the irradiated Mo-99 material to a useable form.

There at least remains a need, therefore, for a process for producing a titanium-molybdate-99 material suitable for use in Tc-99m generators in a timely manner.

SUMMARY OF INVENTION

One embodiment of the present disclosure provides an irradiation target for the production of radioisotopes, including at least one plate defining a central opening and an elongated central member passing through the central opening of the at least one plate so that the at least one plate is retained thereon. The at least one plate and the elongated central member are both formed of materials that produce molybdenum-99 (Mo-99) by way of neutron capture.

Another embodiment of the present disclosure provides an irradiation target system for the production of radioisotopes, having an irradiation target, including at least one plate defining a central opening, and a first elongated central member including an elongated body, a pair of wings extending transversely therefrom at a first end, and a pair of tabs extending transversely therefrom at a second end, the elongated body passing through the central opening of the at least one plate so that the at least one plate is retained thereon, an irradiation target debundling tool, having a body portion including a planar top surface, and a recess extending downwardly into the body of the tool so that a planar portion of the top surface is disposed on each side of the recess, wherein each planar portion of the planar top surface is configured to abut a corresponding wing of the first elongated central member.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Figure 1A:
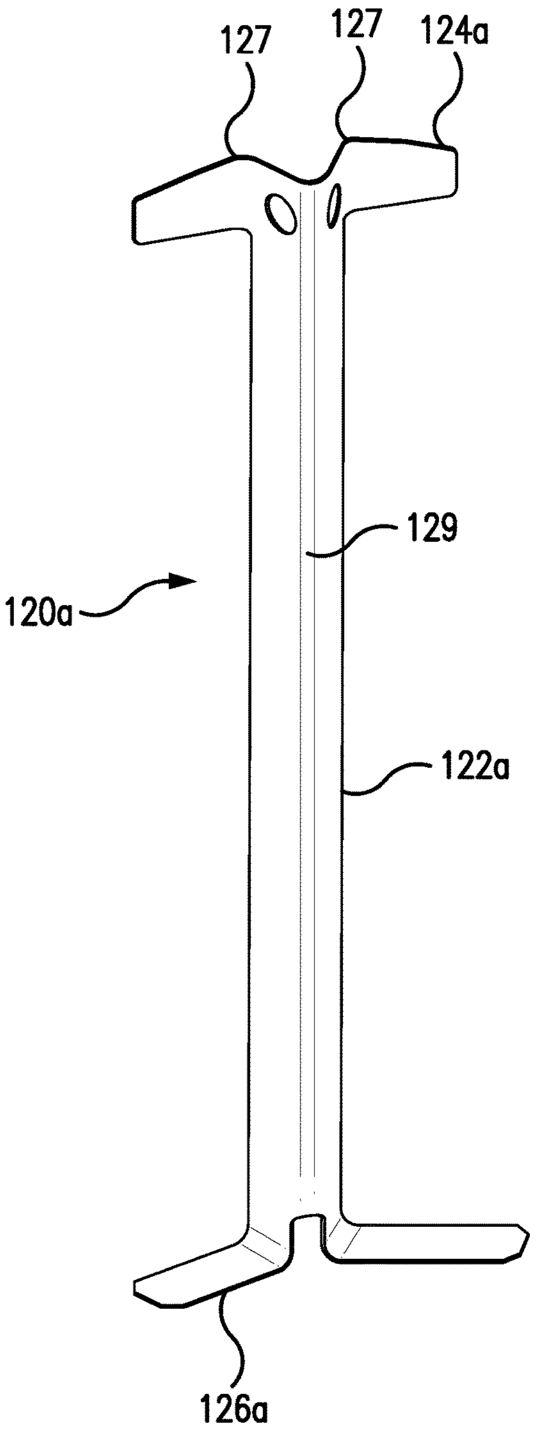
FIGS. 1A and 1B are perspective views of a first retaining clip and a second retaining clip, respectively, that form a rigid spine of an irradiation target in accordance with an embodiment of the present invention.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the irradiation target and debundling tool, such as but not limited to "vertical," "horizontal," "upper," "lower," "above," or "below," refer to directions and relative positions with respect to the target and debundling tool's orientation in its normal intended operation, as indicated in the Figures herein. Thus, for instance, the terms "vertical" and "upper" refer to the vertical direction and relative upper position in the perspectives of the Figures and should be understood in that context, even with respect to a target and debundling tool that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Referring now to FIGS. 1A through FIG. 4, an irradiation target 100 in accordance with the present invention includes a plurality of thin plates 110 that are retained on a rigid spine 120 formed by a pair of retaining clips 120*a* and 120*b*, which are in turn slidably received in an outer canister 102. Preferably, both the plurality of thin plates 110, or disks, and retaining clips 120*a* and 120*b* are formed from the same material, the material being one that is capable of producing the isotope molybdenum-99 (Mo-99) after undergoing a neutron capture process in a nuclear reactor, such as a fission-type nuclear reactor. In the preferred embodiment, this material is Mo-98. Note, however, in alternate embodiments, plates 110 and retaining clips 120*a* and 120*b* may be formed from materials such as, but not limited to, Molybdenum Lanthanum (Mo—La), Titanium Zirconium Molybdenum (Ti—Zr—Mo), Molybdenum Hafnium Carbide (Mo Hf—C), Molybdenum Tungsten (Mo—W), Nickel Cobalt Chromium Molybdenum (Mo-MP35N), and Uranium Molybdenum (U—Mo).

Figure 1B:
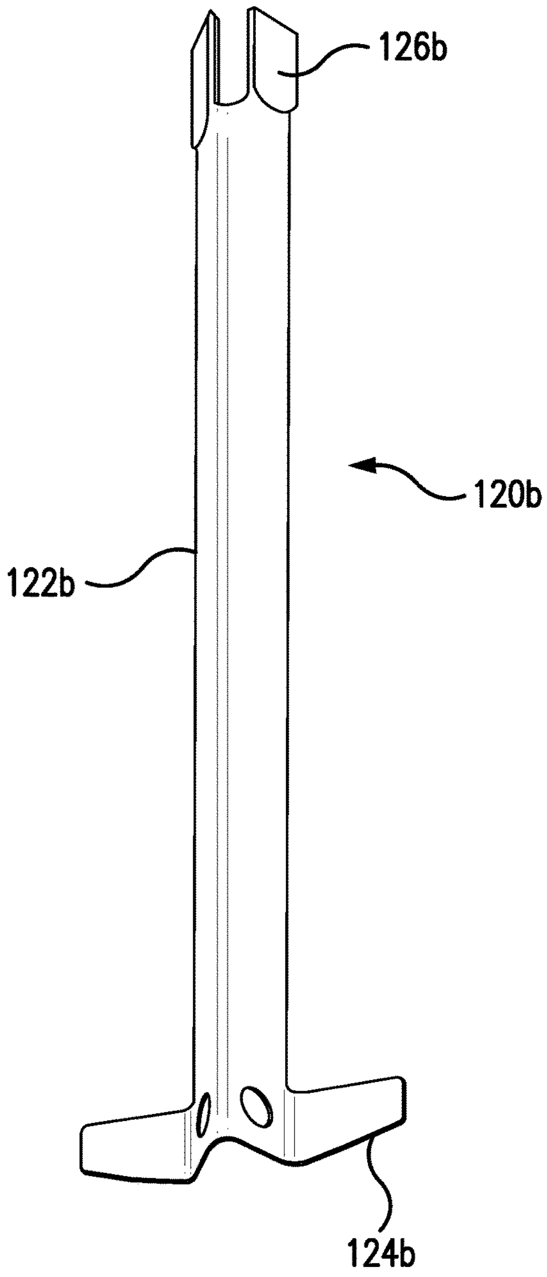
Figure 4:
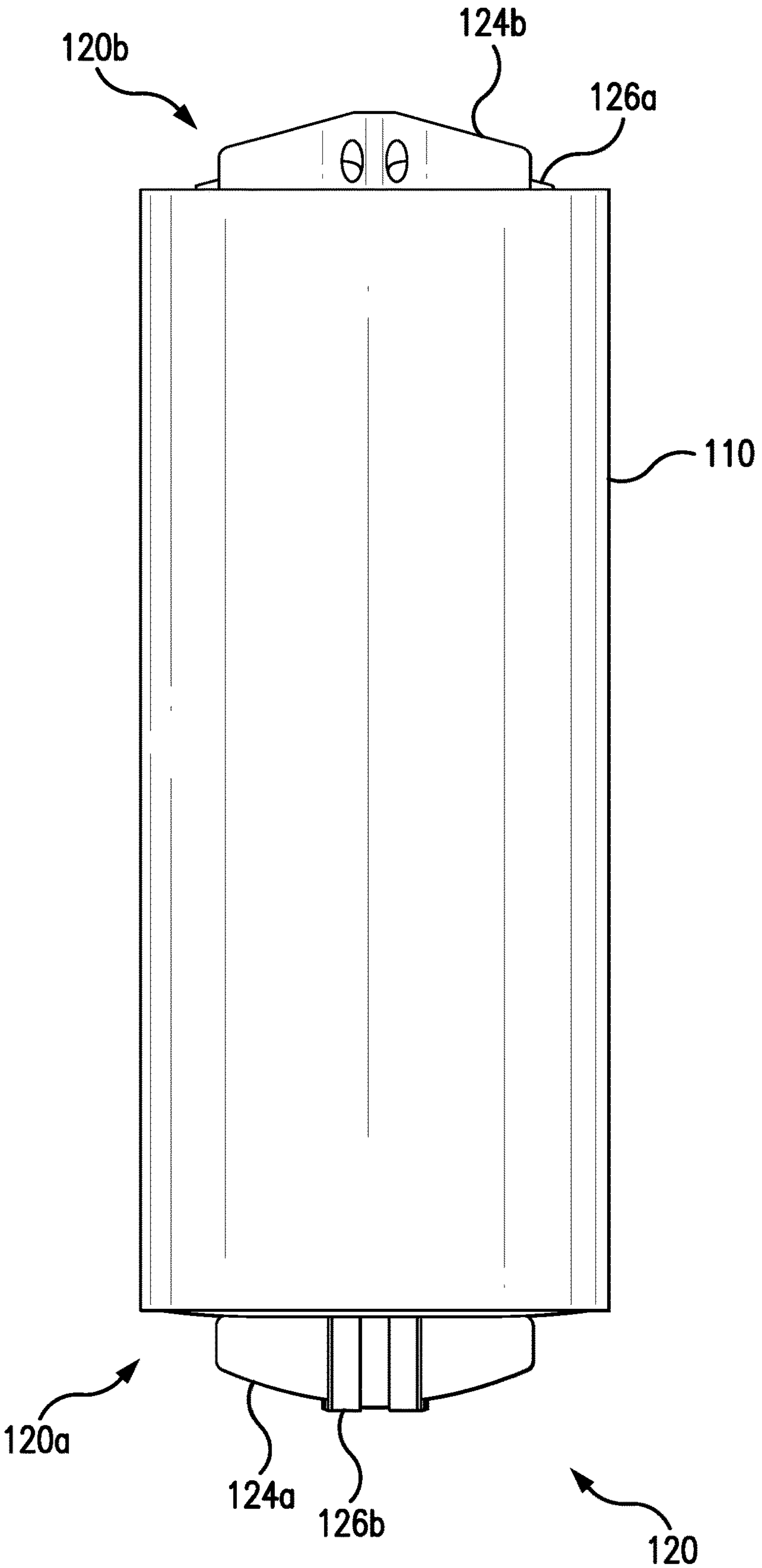
FIG. 4 is a plan view of a plurality of an annular plates retained on the rigid spine of the irradiation target shown in FIG. 2.

Referring specifically to FIGS. 1A and 1B, rigid spine 120 is formed by a first retaining clip 120*a* and a second retaining clip 120*b*, each clip including an elongated body 122*a*, 122*b* that is substantially V-shaped in cross-section, a pair of wings 124*a*, 124*b* at a first end of the elongated body, and a pair of tabs 126*a*, 126*b* at a second end of the elongated body. As shown in FIGS. 1A and 1B, the wings 124*a*, 124*b* of the first and second retaining clips 120*a* and 120*b*, respectively, lie in vertical planes that are parallel to the longitudinal center axes of the retaining clips. The wings 124*a*, 124*b* of the first and second retaining clips 120*a* and 120*b* remain in this position even after assembly of the rigid spine 120 (FIG. 4). Note, in FIGS. 1A and 1B the tabs 126*a*, 126*b* of the first and second retaining clips 120*a* and 120*b*, respectively, are shown in the folded position which occurs after the retaining clips are assembled to form the rigid spine 120. Prior to assembly, tabs 126*a* and 126*b* all extend axially-outwardly from the end of the corresponding elongated body 122*a* and 122*b*, respectively. After assembly of the rigid spine 120, the tabs 126*a* of the first retaining clip 120*a* lie in a horizontal plane that is transverse to the longitudinal center axis of the first retaining clip 120*a*, whereas the tabs 126*b* of the second retaining clip 120*b* lie in vertical planes that are parallel to the longitudinal center axis of the second retaining clip 120*b*. Preferably, the side walls of the elongated bodies 122*a* and 122*b* of the first and second retaining clips 120*a* and 120*b*, respectively, form an inclusive angle of approximately 60°, although other angles are utilized in alternate embodiments.

In the discussed embodiment, the elongated body 122*a*, 122*b* of each retaining clip 120*a*, 120*b* has a length that is slightly greater than the overall length of the plurality of thin plates of irradiation target 100. The maximum width of each elongated body 122*a*, 122*b* allows the end of each retaining clip 120*a*, 120*b* that includes tabs 126*a*, 126*b* to be slid through the bore defined by the plurality of thin plates 110 during the assembly process as discussed in greater detail below.

The majority of the mass of irradiation target 100 lies in the plurality of thin plates 110 that are slidably received on the rigid spine 120. Preferably, each thin plate 110 is a thin annular plate, the reduced thickness of each annular plate 110 provides an increased surface area for a given amount of target material. The increased surface area facilitates the process of dissolving the annular plates after they have been irradiated in a fission reactor as part of the process of producing Ti—Mo-99. Additionally, for the preferred embodiment, each annular plate 110 defines a central aperture 112 so that each annular plate 110 may be slidably positioned on the rigid spine 120. As discussed in greater detail below, the first retaining clip 120*a* is slidably received within the central aperture 112 of the plurality of annular plates 110 prior to the insertion of the second retaining clip 120*b* within the central apertures 112 of the plates 110.

Figure 2:
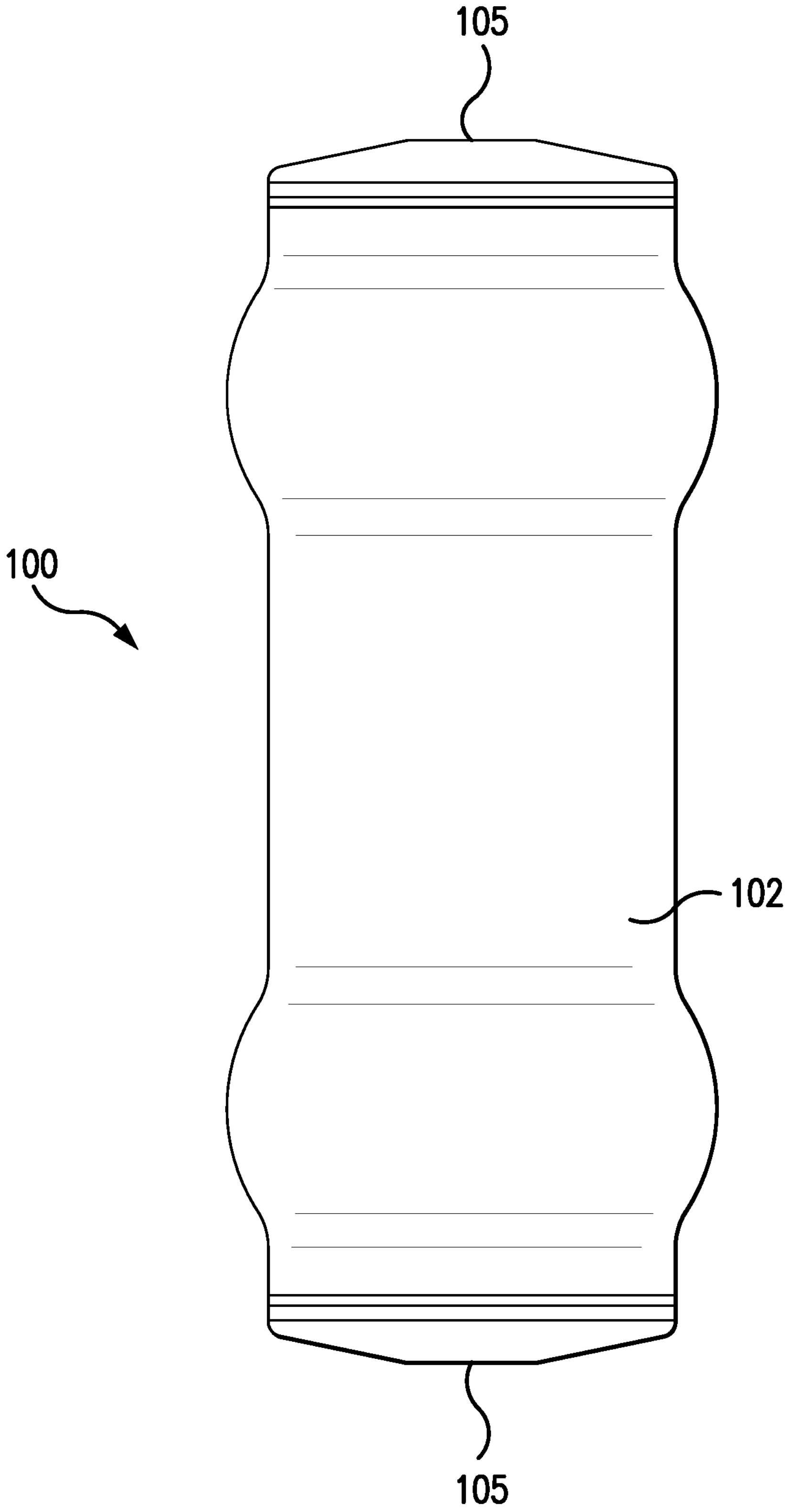
FIG. 2 is a side view of an irradiation target in accordance with an embodiment of the present invention.
Figure 3:
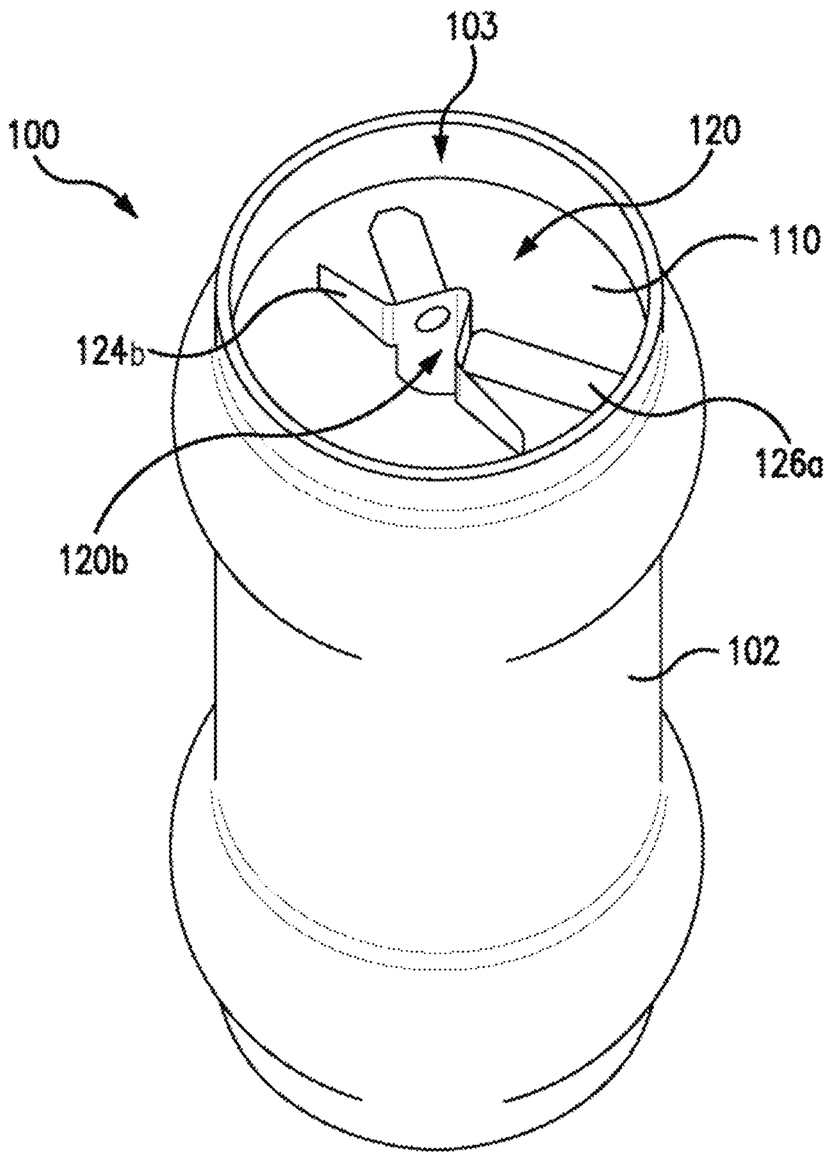
FIG. 3 is a perspective view of the irradiation target as shown in FIG. 2 with an end cap removed.

In the present embodiment, a target canister 102 is utilized to insert a plurality of irradiation targets 100 into a fission nuclear reactor during the irradiation process. As best seen in FIGS. 2 and 3, each target canister 102 includes a substantially cylindrical body portion that defines an internal bore 103. The bore 103 is sealed by end caps 105 so that the annular plates 110 of the irradiation target remain in a dry environment during the irradiation process within the corresponding reactor. Keeping the annular plates 110 of the targets dry during the irradiation process prevents the formation of oxide layers thereon, which can hamper efforts to dissolve the irradiated pates in subsequent chemistry processes in order to reduce the Mo-99 to a usable form.

Figure 5A:
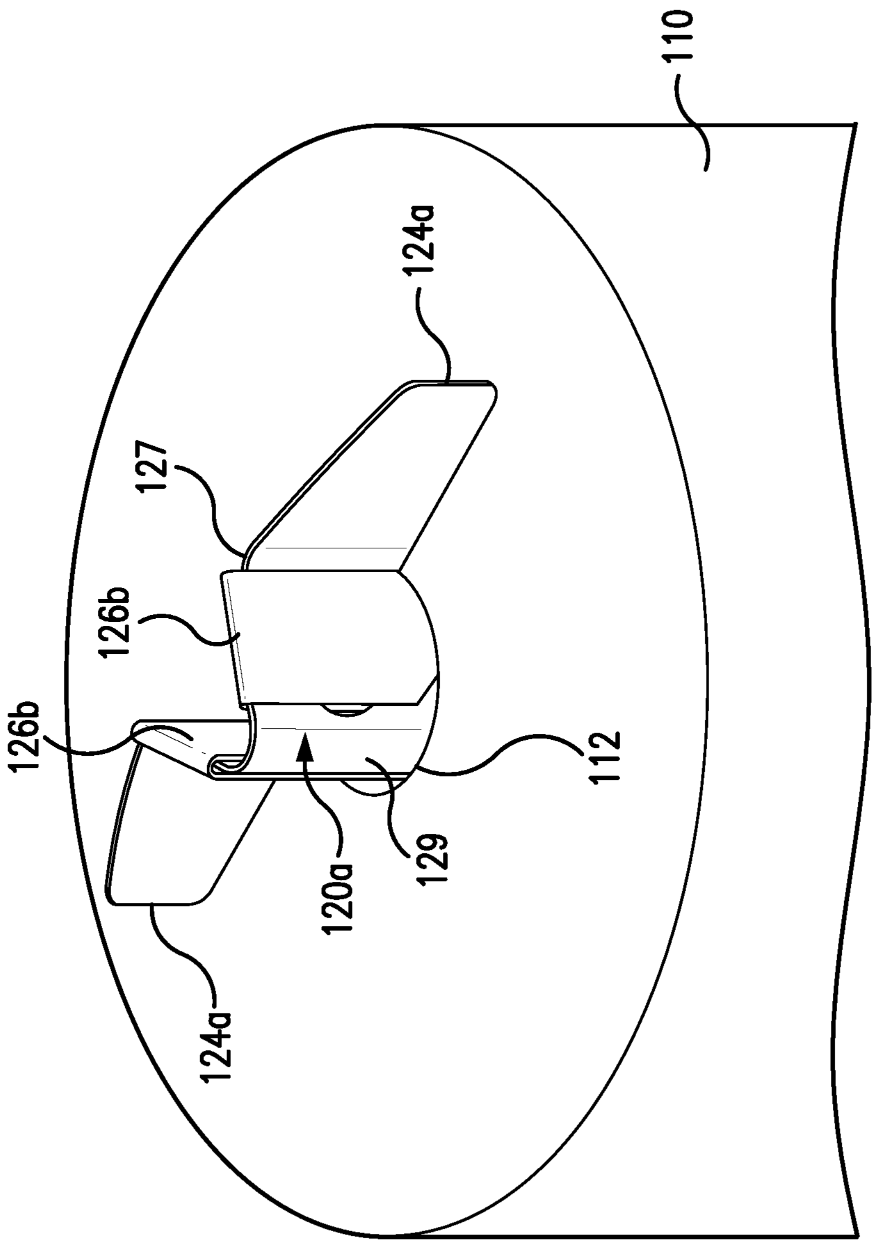
FIGS. 5A and 5B are partial perspective views of the rigid spine and annular disks shown in FIG. 4.
Figure 5B:
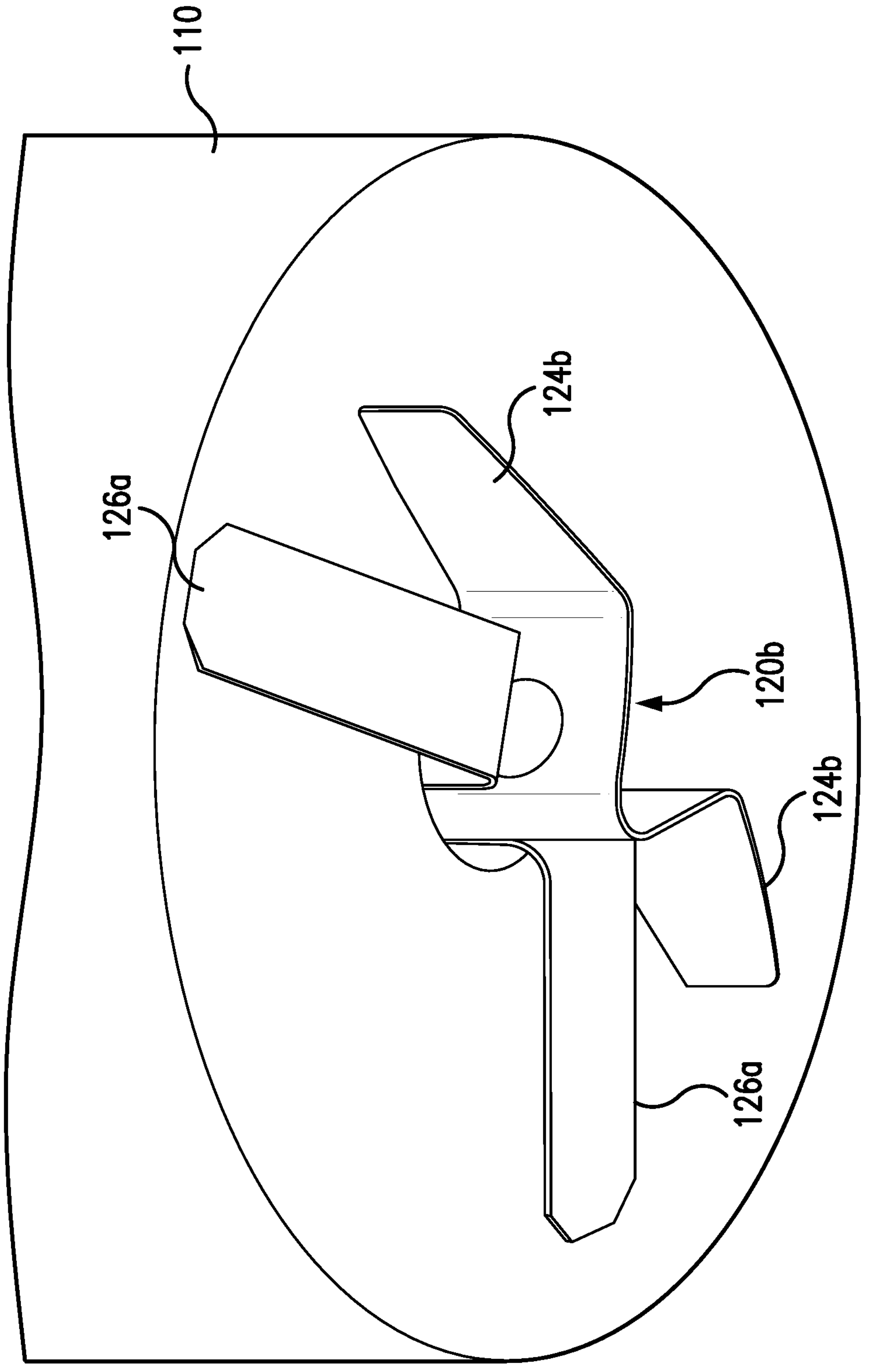
Figure 8:
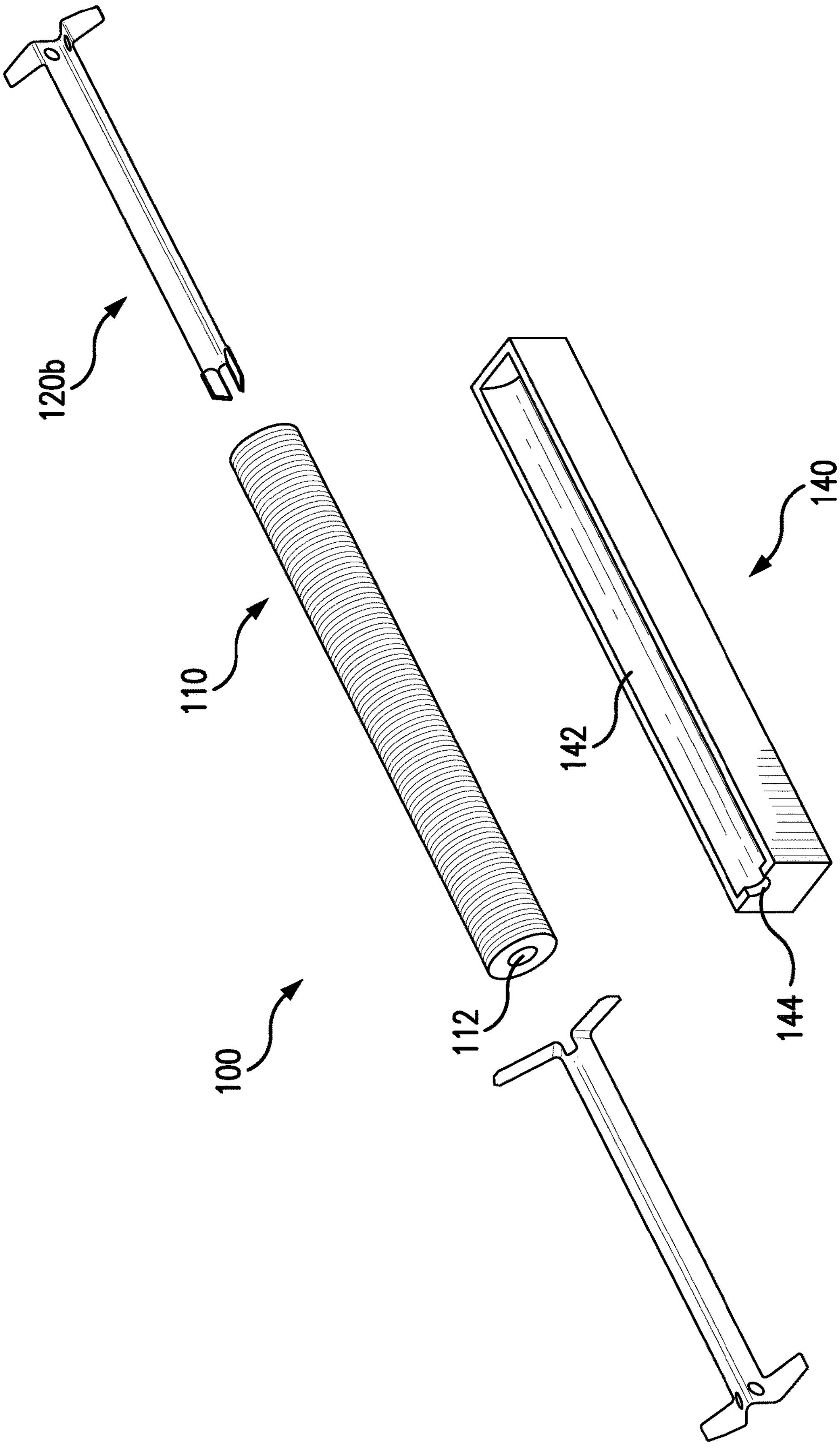
FIG. 8 is a view of the assembly of the irradiation target as shown in FIG. 4.

Referring now to FIGS. 5A, 5B, and 8 the assembly process of irradiation target 100 is discussed. First, a plurality of annular plates 110 is positioned in a semi-cylindrical recess 142 of an alignment jig 140. Preferably, the alignment jig 140 is formed by a 3-D printing process and the plurality of plates 110 is tightly packed in semi-cylindrical recess 142 so that their central apertures 112 are in alignment. As best seen in FIG. 5B, the tabs 126*a* of the first end of the first retaining clip 120*a* are inserted into the central bore of the plurality of annular plates 110 that is tightly packed in alignment jig 140. A semi-circular recess 144 is provided in an end wall of the alignment jig 140 so that the first retaining clip 120*a* may be aligned with the central apertures 112. The first retaining clip 120*a* is inserted until the bottom surfaces of its wings 124*a* come into abutment with the end face of the plurality of annular plates 110. After first retaining clip 120*a* is fully inserted in the plurality of annular plates 110, the tabs 126*a* that extend outwardly beyond the plurality of annular plates 110 are bent outwardly until each tab 126*a* is flush against the outer surface of the outermost annular plate 110. As such, after assembly, the tabs 126*a* of the first retaining clip 120*a* lie in a horizontal plane that is transverse to the longitudinal center axis of the first retaining clip 120*a*.

Next, as best seen in FIGS. 5A, the tabs 126*b* of the second retaining clip 120*b* are inserted into the end of the central bore 112 from which tabs 126*a* of first retaining clip 120*a* extend. As shown, the first and second retaining clips 120*a* and 120*b*, respectively, are disposed within the central bore of the plurality of annular plates 110 so that their elongated bodies 122*a*, 122*b* are nested together. The second retaining clip 120*b* is slidably inserted into the bore of annular plates 110 until its wings 124*b* abut the outer surface of the outermost annular plate 110. In this position, the tabs 126*b* of second retaining clip 120*b* extend axially-outwardly beyond wings 124*a* of first retaining clip 120*a*. As best seen in FIG. 5A, the tabs 126*b* of the second retaining clip 120*b* are folded over the wings 124*a* of the first retaining clip 120*a*, thereby retaining the plurality of annular plates 110 between the wings 124*a*, 124*b* of first and second retaining clips 120*a*, 120*b*.

Figure 6:
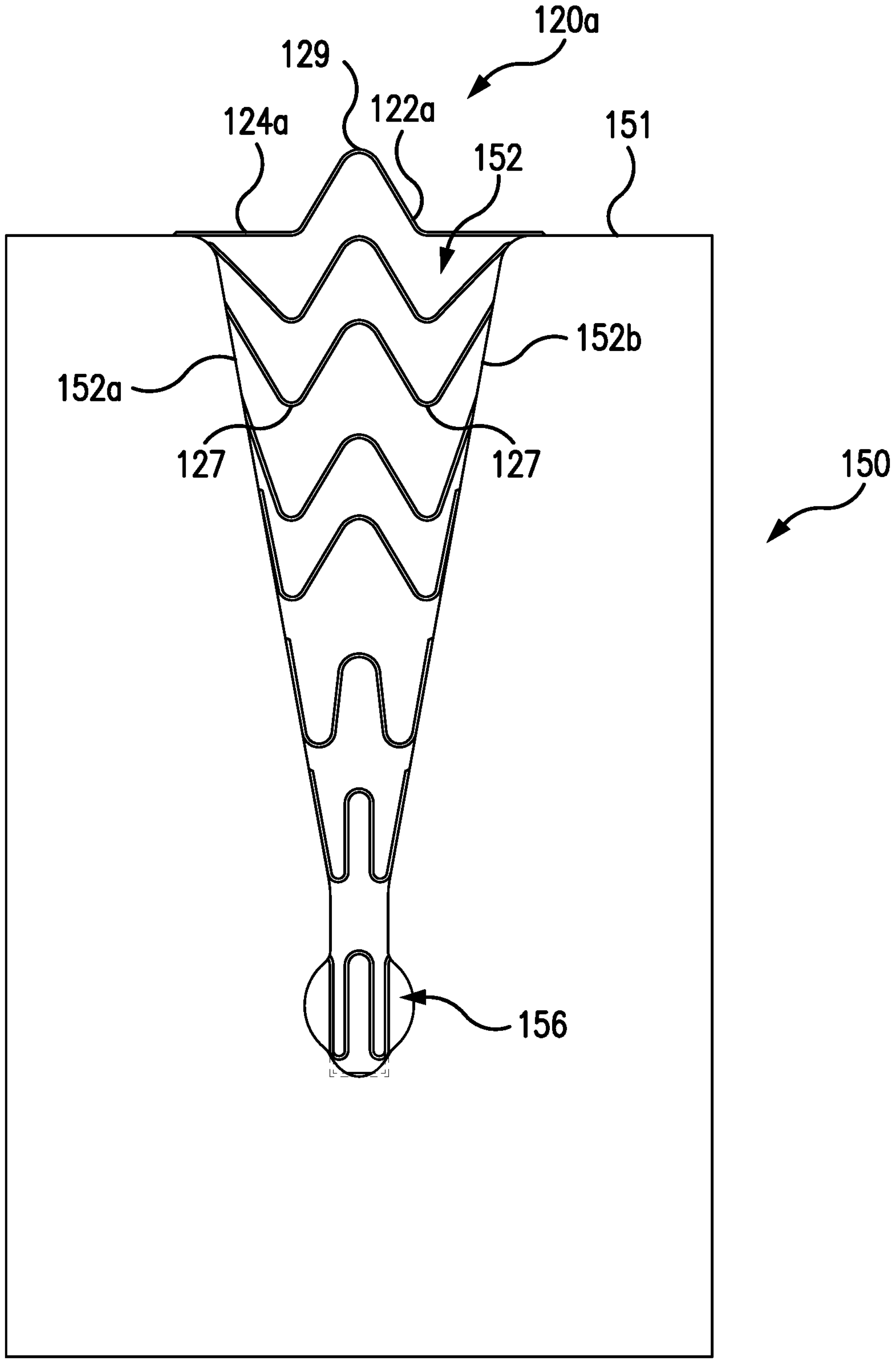
FIG. 6 is a schematic view of a debundling tool in accordance with an embodiment of the present invention and the various steps performed to remove the rigid spine from the irradiation target shown in FIG. 4.
Figure 7A:
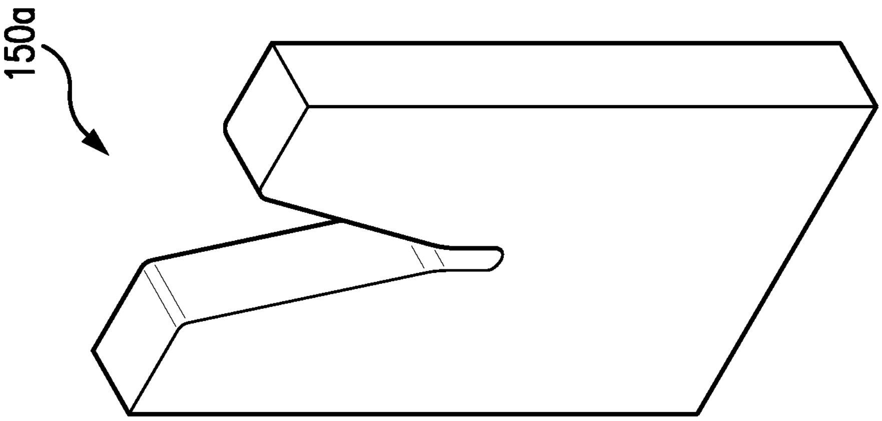
FIGS. 7A through 7F are perspective views of alternate embodiments of debundling tools in accordance with the present invention.
Figure 7B:
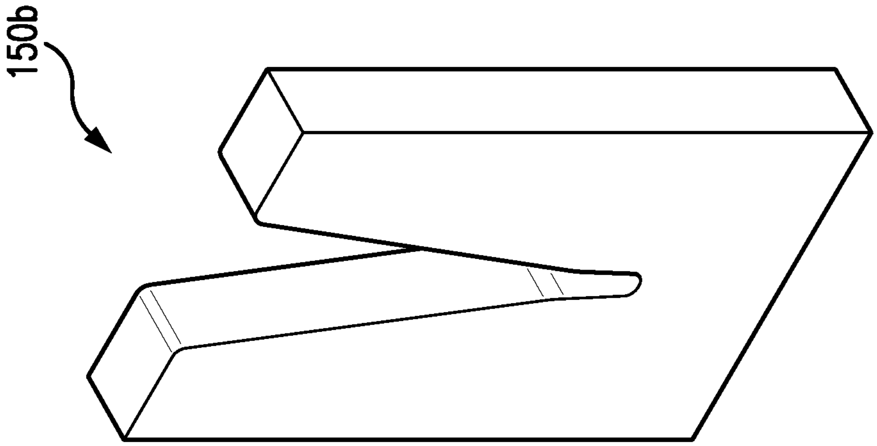
Figure 7C:
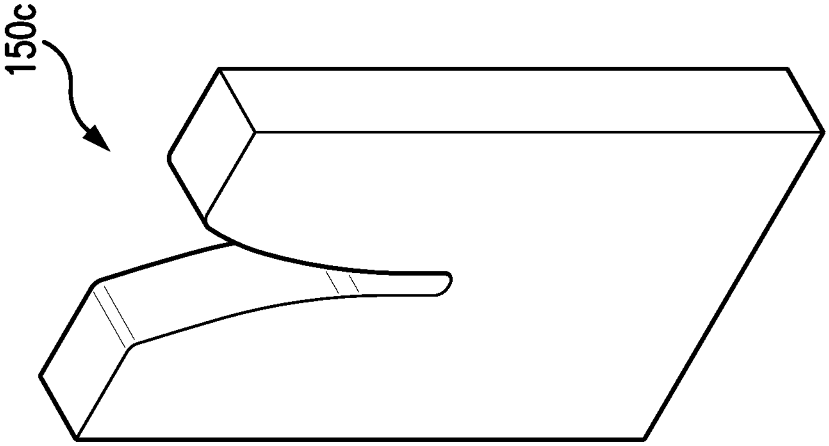
Figure 7F:
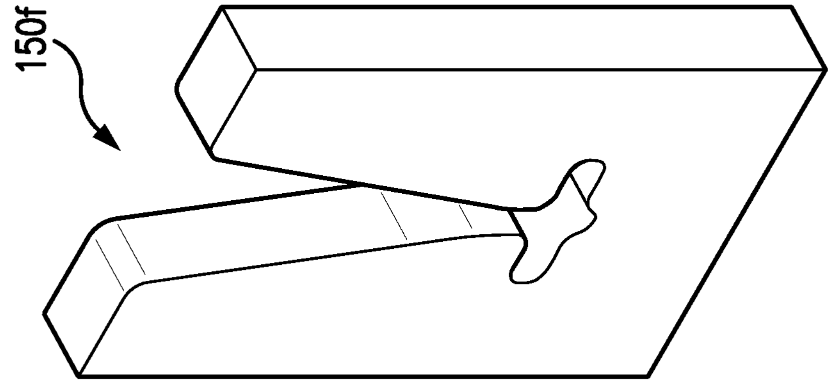
Figure 7E:
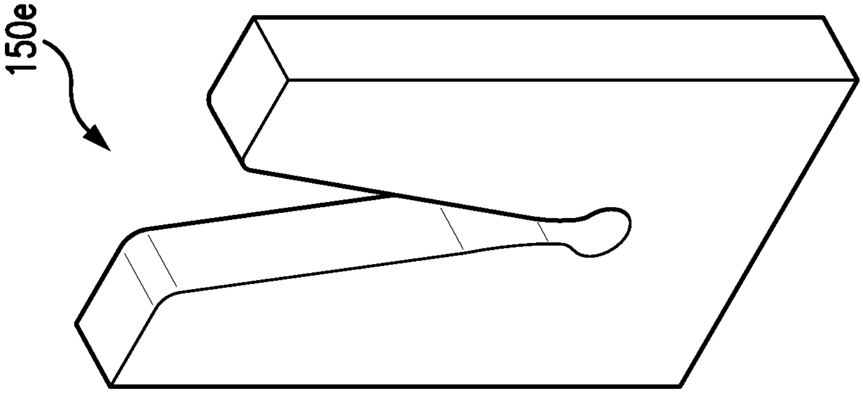
Figure 7D:
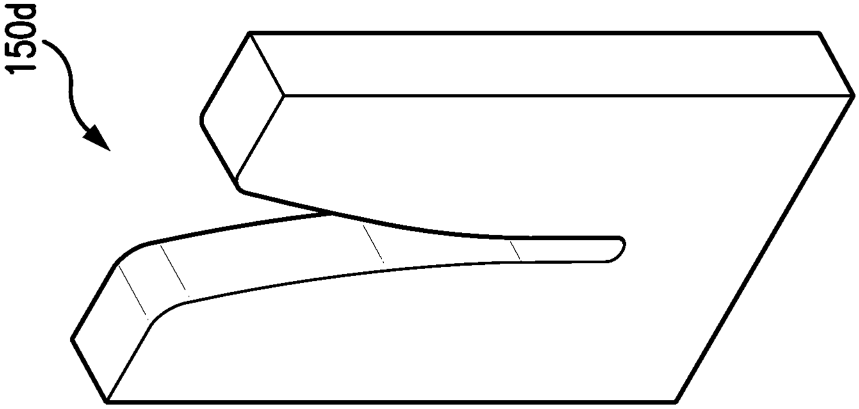

After irradiation of target canister 102 and removal of the plurality of annular plates 110 therefrom, the rigid spine 120 is removed to allow for further processing of the annular plates 110. As shown in FIGS. 6 and 7A, a debundling tool 150 is preferably used to collapse the expanded wings 124*a* (FIG. 4) of the first retaining clip 120*a* so that the rigid spine 120 may be slidably withdrawn from the bore of the plurality of annular plates 110. Referring specifically to FIG. 6, to collapse the expanded wings 124*a*, the wings 124*a* are positioned adjacent a top surface 151 of the debundling tool 150 so that the outermost end of the elongated body 122*a* is centered above a recess 152 of the debundling tool 150. The recess 152 is formed by two camming surfaces 152*a* and 152*b* that form a flared entrance at their uppermost end and terminate at a narrowed apex 156, forming an elongated V-shape. Once positioned at the entrance, the target is urged downwardly so that the wings 124*a* move downwardly into recess 152. As the wings 124*a* progresses downwardly into recess 152, the wings 124*a* are folded inwardly toward each other, as are the side walls forming elongated body 122*a*. As shown, the wings 124*a* bend inwardly toward the elongated body 122*a* at the juncture 127 of the side walls of the body and the wings 124*a*. As well, the sidewalls of the elongated body 122*a* bend inwardly toward each other at their apex 129. Ultimately, the wings 124*a* are collapsed down to a size that allows them to be withdrawn through the bore of the plurality of irradiated plates 110 by exerting axial outward force on the rigid spine 120 from the end including wings 124*b* and tabs 126*b*. Note, the shape of the recess used to collapse the wings of the retaining clip may have any number of cross-sectional shapes, as shown in the embodiments 150*a* through 150*f* in FIGS. 7A through 7F.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. An irradiation target for the production of radioisotopes, comprising:

a plurality of plates each defining a central opening; and a first elongated central member passing through the central openings of the plurality of plates so that the plurality of plates are retained thereon, the first elongated central member including an elongated body, a pair of wings extending transversely therefrom at a first end and lying in a vertical plane that is parallel to a longitudinal center axis of the first elongated central member, and a pair of tabs extending transversely therefrom at a second end;

a second elongated central member passing through the central openings of the plurality of plates, the second elongated central member including an elongated body, a pair of wings extending transversely from a first end and lying in a vertical plane that is parallel to a longitudinal center axis of the second elongated central member, and a pair of tabs extending therefrom at a second end, wherein the tabs of the second elongated central member are adjacent to the wings of the first elongated central member;

wherein the tabs of the second elongated central member are folded over the wings of the first elongated central member so that the tabs of the second elongated central member lie in a plane that is parallel to the longitudinal center axis of the second elongated central member;

wherein the plurality of plates, the first elongated central member, and the second elongated central member are each formed of materials that produce molybdenum-99 (Mo-99) by way of neutron capture.

2. The irradiation target of claim 1, wherein:

each central opening of each plate is a circular aperture.

3. The irradiation target of claim 1, wherein the wings of the first elongated central member abut a first end face of the plurality of plates, the tabs of the first elongated central member abut a second end face of the plurality of plates, and the tabs lie in a plane that is transverse to a longitudinal center axis of the first elongated central member.

4. The irradiation target of claim 3, wherein the elongated body of the first elongated central member and the elongated body of the second elongated central member are each V-shaped and formed by a pair of side walls intersecting at an apex.

5. The irradiation target of claim 1, wherein each plate is an annular plate and the plurality of annular plates, the first elongated central member, and the second elongated central member are formed from one of Molybdenum Lanthanum (Mo—La), Titanium Zirconium Molybdenum (Ti—Zr—Mo), Molybdenum Hafnium Carbide (Mo Hf—C), Molybdenum Tungsten (Mo—W), Nickel Cobalt Chromium Molybdenum (Mo-MP35N), and Uranium Molybdenum (U—Mo).

6. The irradiation target of claim 1, wherein each plate is an annular plate and the plurality of annular plates and the first and the second elongated central members are formed of molybdenum-98 (Mo-98).

7. The irradiation target of claim 1, wherein the elongated body of the first elongated central member and the elongated body of the second elongated central member are nested together.

* * * * *